Figure 11:
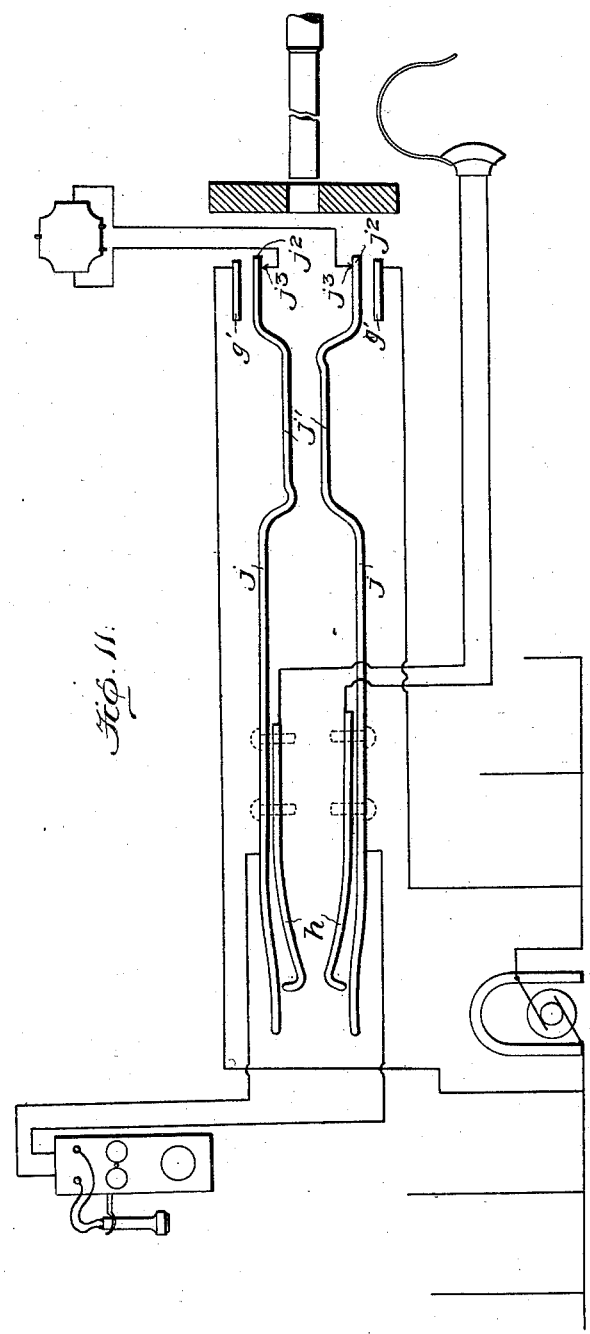

No. 685,846. Patented Nov. 5, 1901.
H. F. JONES.
SWITCHBOARD FOR TELEPHONE OR LIKE EXCHANGES.
(Application filed Nov. 6, 1900.)
(No Model.) 3 Sheets—Sheet 1.
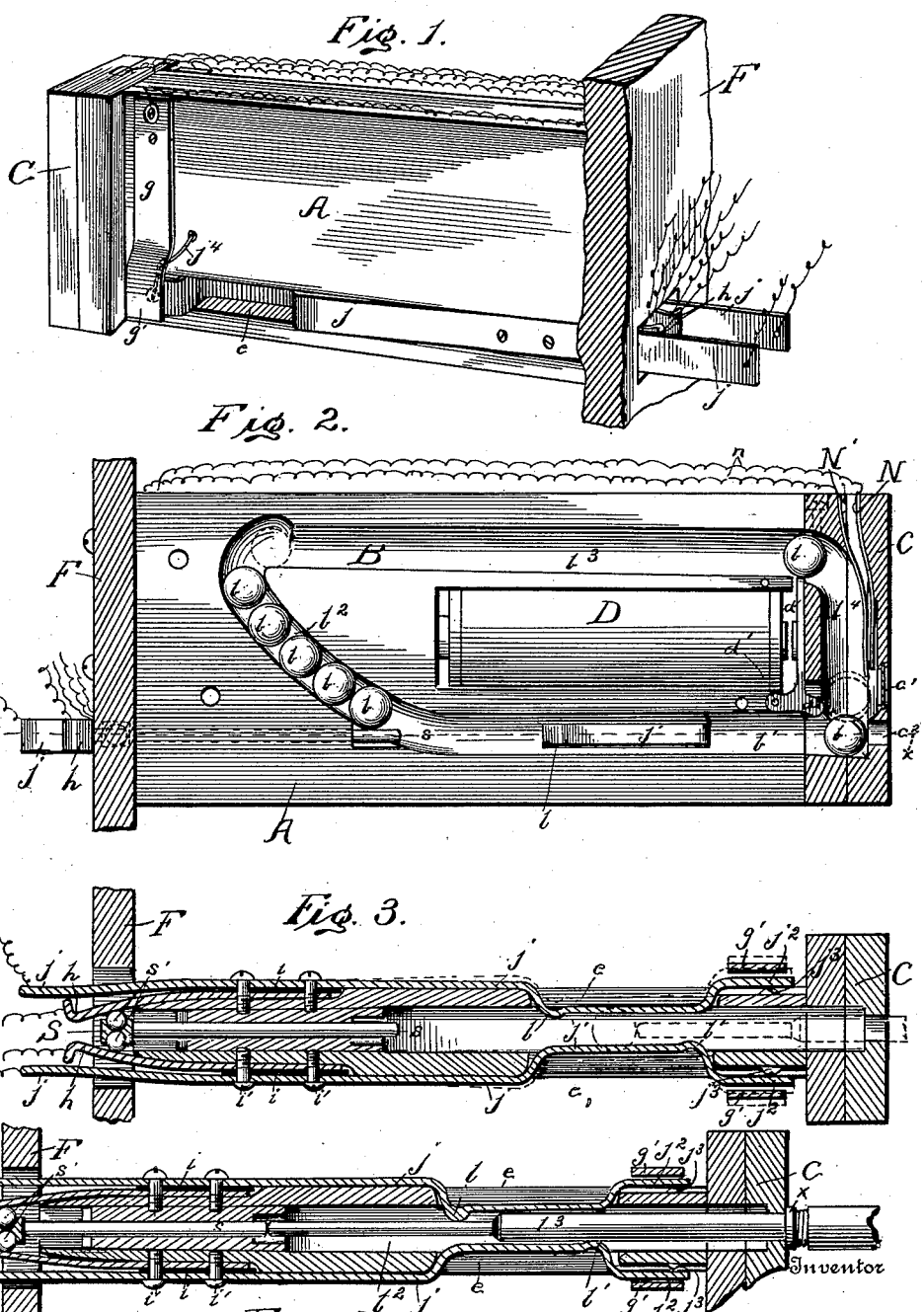

No. 685,846. Patented Nov. 5, 1901.
H. F. JONES.
SWITCHBOARD FOR TELEPHONE OR LIKE EXCHANGES.
(Application filed Nov. 6, 1900.)
(No Model.) 3 Sheets—Sheet 2.
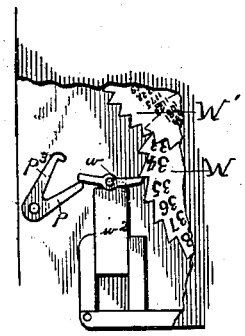
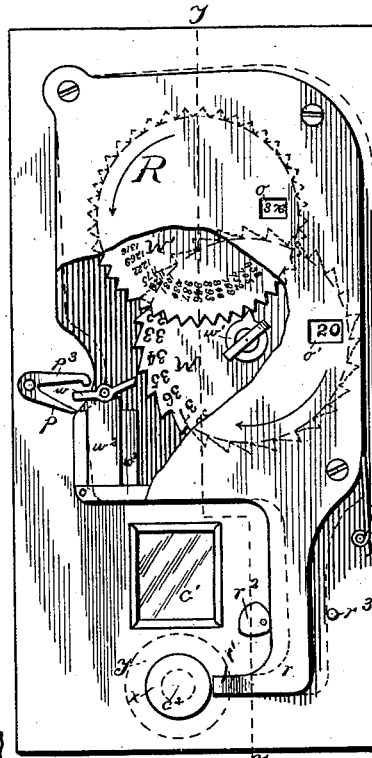
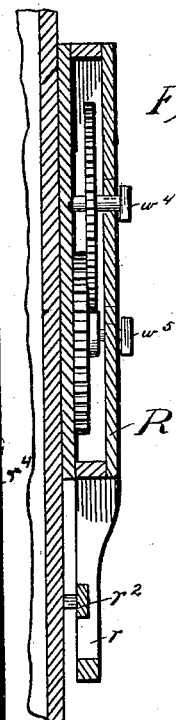
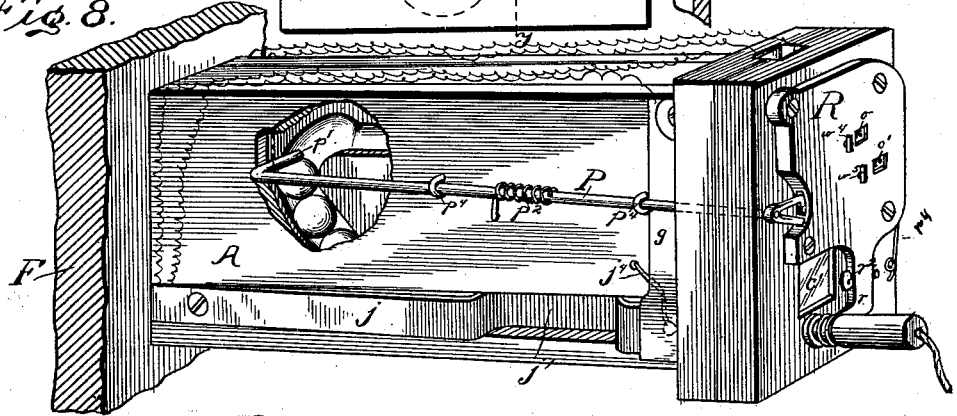
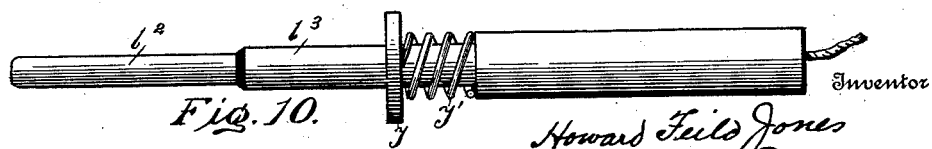

No. 685,846. Patented Nov. 5, 1901.
H. F. JONES.
SWITCHBOARD FOR TELEPHONE OR LIKE EXCHANGES.
(Application filed Nov. 6, 1900.)
(No Model.) 3 Sheets—Sheet 3.

Witnesses
Inventor
Howard Feild Jones
John E. Burch
By Johnson and Johnson
Attorneys

UNITED STATES PATENT OFFICE.

HOWARD FEILD JONES, OF WILSON, NORTH CAROLINA.

SWITCHBOARD FOR TELEPHONE OR LIKE EXCHANGES.

SPECIFICATION forming part of Letters Patent No. 685,846, dated November 5, 1901.

Application filed November 6, 1900. Serial No. 35,640. (No model.)

*To all whom it may concern:*

Be it known that I, HOWARD FEILD JONES, a citizen of the United States, residing at Wilson, in the county of Wilson and State of North Carolina, have invented certain new and useful Improvements in Switchboards for Telephone or Like Exchanges, of which the following is a specification.

The following description read in connection with the drawings will enable any one skilled in the art to which my invention relates to understand its nature and to practice it in the form in which I prefer to employ it; but it will be understood that my invention is not limited to the precise form herein illustrated and specified, as various modifications and equivalent changes may be made and adapted by the skilled constructor to carry out my invention.

Referring to the accompanying drawings, Figure 1 shows in perspective one of my combined spring-jacks and annunciator looking from the rear, the back board F being broken away, showing the several spring plates or arms which the plug and balls actuate. Fig. 2 is an interior side view of the same, one of the side plates being removed and the face-plate being shown in central vertical longitudinal section and shows the relative positions of the endless ball-raceway, magnet and armature, line spring-arms, and operator's listening spring-arms. Fig. 3 is a horizontal section taken on the line $x\,x$ of Fig. 2, the side plate of the frame which was removed in Fig. 2 being restored, showing the positions of the line, generators, and operator's listening spring contact-arms in their normal positions, the line spring-arms $j$ being shown as normally in circuit with the annunciator-contacts $j^3$, the operator's listening spring-arms being out of contact with the line, which is their normal position. In dotted lines the line spring-arms are shown spread by the passing ball and in contact with the generator spring-arms $g\,g$. Fig. 4 is a view similar to Fig. 3, showing the plug inserted to its full extent to connect with the line spring-arms and as having pushed the spreader S against the operator's listening spring-arms to contact said spring-arms with the line spring-arms which extend back of the frame. Fig. 5 is a front view of my combined annunciator and spring-jack, showing the registering device, a portion of the registering-casing being broken away to show its operation. In dotted lines the register is shown as pushed to the right, so as to be unaffected by the rocker-arm. Fig. 6 is a section of the same taken on the line $y\,y$ of Fig. 5. Fig. 7 is a detail showing the ratchet as uplifted by the rocker-arm. Fig. 8 is a perspective view of my combined spring-jack and annunciator looking from the front, a portion of the said plate being broken away and showing the manner of operating the rocker-arm by the passing ball. Fig. 9 shows an ordinary switchboard-plug fitted with a spring flange or collar on the inner end of the handle. Fig. 10 shows a plug similar to that shown in Fig. 8, the spring flange or collar being of greater diameter. Fig. 11 is a diagrammatic view of the spring-jack, showing the circuit connections therewith of the line, the generator, the annunciator, and the operator's listening-telephone.

My indicator or annunciator device, as shown in Figs. 1 and 2, consists of a frame or casing A, having an endless interior passage or ball-raceway B, with a bottom horizontal arm $b'$, a rearward upwardly-inclined arm $b^2$, and frontwardly downwardly inclined arm $b^3$. A face-plate C is secured to the front of the frame and has a vertical bore or passage $b^4$, which forms a continuation of the ball-raceway and connects its upper arm $b^3$ and its lower arm $b'$. Centrally longitudinally of the frame and between the upper and lower arms of the raceway is a cavity containing an electromagnet D, whose armature $d$ is at its forward end hinged below at $d'$ and projects above normally into the path of the non-conducting balls or drop-signals $b\,b\,b$, which move in the raceway B. At its hinged end the armature has a lug $d^2$ projecting into the lower horizontal arm of the raceway for a purpose hereinafter explained. One ball is normally held at the forward end of the upper arm $b^3$ of the endless raceway by the projecting top of the armature $d$ and another ball is normally held at the bottom of the vertical arm $b^4$ of the raceway, the bottom of the raceway at this point being slightly inclined and keeps the ball from being jarred back. When a subscriber rings up the exchange, the electromagnet is energized and pulls its armature from beneath the ball which it normally retains and allows said ball to drop down through the passage $b^4$ in the face-plate, and it falls and rests on the ball normally held at the bottom of said passage and against a glass window $c'$ and constitutes a perfect visible-appearing signal, which the operator may instantly and plainly see through said window. The plug socket or orifice $c^2$ is located just below the window $c'$ and just in line with the lower arm of the raceway. Upon the appearance of the ball at the window the exchange operator inserts one of a pair of plugs into the orifice $c^2$ and pushes the ball normally held just behind it; but it does not dislodge the ball just dropped, as such ball is held up by the plug in readiness to drop and take the place of the ball dislodged by the plug upon the withdrawal of the plug. The plug continues to push the first ball back through the lower arm of the raceway until the ball meets the balls retained in the incline. It now pushes these balls up the incline and lifts the top one, as shown in dotted lines in Fig. 2, into the upper arm of the raceway, which is inclined downward. This ball now rolls down toward the front and is caught by the projecting top of the armature $d$ and retained, as was the ball which preceded it, in the raceway. The insertion of the plug makes electrical connections, as hereinafter explained, and enables the operator to ascertain the number of the subscriber desired. The operator then inserts the other of the pair of connecting-plugs into the plug-orifice of an identical combined annunciator and spring-jack belonging to the line of the telephone to be called up and establishes the circuit between the two subscribers. In inserting the plug for the telephone which is "called up" it is necessary (since the magnet would not be energized) to mechanically throw down a ball to be in readiness to take the place of the ball which the plug dislodged. I accomplish this by the provision of an arm or lug $d^2$, projecting from the lower end of the armature into the path of the ball dislodged by the plug. The ball in passing lifts said lug and mechanically forces its armature toward the magnet, and thus dislodges the ball which is normally held at the top of the vertical passage $b^4$, so that when the plug is withdrawn said ball may fall and lodge behind the plug-hole in readiness for the next insertion of the plug. The plug being of less diameter than the balls will not affect or operate the lower projecting arm $d^2$ of the armature except through the instrumentality of the ball. Thus it will be seen that the indicator of my annunciator, which is the falling ball, is perfectly reset or restored upon the insertion of the plug and not by any movement of the operator other than that required to insert the plug.

Longitudinal slots or recesses are let into the outer sides of the frame and run parallel to and in the same horizontal plane with the lower horizontal arm of the interior ball-raceway. An arm of the spring-jack is fastened in each of these slots, and through the openings $e$ $e$ in the walls between the slots and interior raceway the spring-jack partially projects into the horizontal arm of the raceway for a purpose presently stated. The spring-jack consists of the line spring-arms $j j$, having bends or shoulders $j'$ $j'$ projecting through the openings $e$ $e$ into the horizontal arm of the raceway. The generator spring-arms $g$ $g$ are fastened to the frame and lie at right angles to the line spring-arms and on their outer sides, as seen in Fig. 1. The line spring-arms extend out back of the frame at either side thereof. At the back of the frame and between the line spring-arms are opeator's listening spring-arms. Between the operator's spring-arms is a spreader device S, having a stem $s$ projecting through a bore into the lower arm of the raceway into the path of the plug. A small pin on the spreader-stem moves in a slot and prevents the stem from turning. Balls or rolls $s'$ on the outer end of the spreader make its movement between the operator's spring-arms easy. One line spring-arm and one operator's listening spring-arm are fastened in each slot and are insulated from each other at their point of fastening by a separating and insulating plate $i$, Fig. 3. Screws or bolts $i'$ securely fasten them in the slots. The free ends $g'$ of the generator spring-arms normally stand separated from the line spring-arms $j$ $j$ by only a little distance, so that the plug pushes the ball between the projecting shoulders $j'$ $j'$ of the line spring-arms, and spreading them forms the contact at the free end $g'$ of the generator spring-arm $g$. The free ends $j^2 j^2$ of the line spring-arms normally contact with the annunciator-contacts $j^3 j^3$, and this contact is broken and held so as long as a ball or plug is between the projecting shoulders $j'$ of the line spring-arms, Fig. 3. The ball is of greater diameter than the plug, and when it is pushed between the projecting shoulders $j'$ $j'$ of the line spring-arms it contacts them with the generator spring-arm $g$ $g$ at $g'$ $g'$, making a wiping contact. (Shown in dotted lines in Fig. 3.) The diameter of the plug is not sufficient to maintain this contact, but is sufficient to break the contacts of the line spring-arms with the annunciator-contacts $j^3 j^3$. (See Fig. 4.) The line-wires are fastened to the line spring-arms $j j$, and the generator-wires are fastened to the generator spring-arms $g$ $g$, and the operator's wires are fastened to the operator's spring-arms $h$ $h$ in any suitable manner and lead thence to the usual wires at the back of the switchboard.

A pair of connecting-plugs, Figs. 8 and 9, having two terminals are used in conjunction with the spring-jacks of the subscribers' telephones to establish communication between the subscribers and between each of them and the exchange-operator's telephone and to make the necessary signaling-calls.

The construction of my switchboard may be best described by a description step by step of the operation and functions of a pair of the combined spring-jacks and annunciators.

The annunciator devices stand normally as shown in Fig. 2, a ball being retained by the armature at the top of the vertical arm $b^4$ of the raceway and another ball at the bottom just behind the plug-orifice $c^2$. The subscriber's line is in circuit with the annunciator-coil at $j^3 j^3$ through the short wires $j^4$, which lead in through holes in the side plates to the magnet, Fig. 1, and when the calling subscriber rings the magnet is energized and releases its retained ball, which drops down the vertical arm $b^4$ of the raceway and lodges upon the bottom ball in the position shown in light dotted lines in Fig. 2 and is a perfect-appearing signal to be seen through the window $c'$ in the face-plate. The operator then takes one of a pair of connecting-plugs and inserts it in the socket to answer the caller. The plug pushes the ball back and holds the ball just dropped up and continuing to push the ball formerly held on the incline just behind the plug-orifice $c^2$, which ball on arriving at the position shown in dotted lines in Fig. 3 will spread the line spring-arms $j j$ and make contact thereof with the generator spring-arms $g g$, the result of which will be a ring on the telephone of the subscriber who has called. This may be undesirable; but as the length of ringing depends upon the length of time the ball takes in passing over the projecting shoulders $j' j'$ of the line spring-arms it is obvious that a quick insertion of the plug would only cause a slight ring, which I do not think would be very disagreeable and the objection to which would be obviated altogether if the calling subscriber kept his receiver on hook until such slight ringing has ceased and which can be advantageously employed as an automatic return signal, and thus obviate the holding of the receiver to the ear, always tedious when waiting for operator. When the plug, which is of less diameter than the ball, pushes the ball past the rear ends of the projecting shoulders $j' j'$ of the line spring-arms, said arms will spring toward the plug, and a hump $l$ on one of the line spring-arms will contact with a terminal contact-surface $l^2$ on the plug, and a hump $l'$ on the other line spring-arm will contact with another terminal contact-surface $l^3$ on the plug. It is evident that no generator-current can come in contact with the plug while the "ball" is ringing the telephone of a subscriber "wanted" or "calling." The plug is pushed farther in and presses back the stem $s$ of the spreader S, which bears against the operator's spring-arms $h h$ and presses them out against the line spring-arms $j j$, as seen in Fig. 4, to bridge the line, and thereby establish communication between the subscriber calling and the exchange operator. The operator then ascertains the number of the telephone with which the calling subscriber wants communication. When the operator releases the pressure on the plug, the spring-arms $h h$ will bear against the rolls or balls on the spreader and pinch it back to its normal position, pushing the plug back with it to the position shown in Fig. 3. The insertion of the plug has placed another ball in the upper inclined arm $b^3$ of the raceway, and said ball, rolling forward, is retained by the armature, as before explained, which restores the signaling mechanism. Having ascertained the number of the telephone desired, the operator takes the other of the pair of plugs and inserts it into the socket of the combined spring-jack and annunciator belonging to that telephone, which is identical in construction with the combined spring-jack and annunciator of the calling telephone. The balls in the raceway are in the positions shown in full lines in Fig. 2. As the magnet of the called telephone has not been energized, the top ball would not fall; but it is necessary that the top ball should fall, for the reason that when the plug is pushed home it throws another ball into the upper inclined arms $b^3$ of the raceway, which would make two balls held by the armature, neither of which would be released to take the place of the ball just dislodged from behind the orifice $c^2$ by the plug. To obviate this, I provide for mechanically throwing the ball by the passage of the lower ball, pushed by the plug, under the projecting bottom lug $d^2$ of the armature. This lifts the lug $d^2$ and trips the ball held at the top of the armature and allows the ball to fall down on the plug to the position shown in heavy dotted lines in Fig. 2. After the ball gets past the lug $d^2$ the lug drops back and the armature is reset. The plug is of less diameter than the ball and does not touch or affect this lug $d^2$.

It is of course necessary that the telephone to be called should be "rung up," and this I do by pausing in inserting the plug just when the ball has arrived at a point in its passage between the projecting shoulders $j' j'$ of the line spring-arms, as shown in dotted lines in Fig. 3. When the ball arrives at this point, the annunciator connection at $j^3 j^3$ has been broken; but the connection between the generator spring-arms and the line spring-arms, as shown in Fig. 3 in dotted lines, is established, the result of which will be to ring up the telephone called. The ball may be held or paused at this point to give a sufficient ringing on the telephone called, and then the operator pushes the plug farther in, as seen in Fig. 4, and the complete talking-circuit is made between the two subscribers through the pair of connected plugs. Another ball is pushed into the upper inclined arm $b^3$ of the ball-raceway and is retained by the top of the armature to restore the annunciator device.

For the purpose of counting the number of calls made by the subscribers my switchboard embodies a registering device in connection with each combined annunciator and spring-jack. The registering device R, as shown in Fig. 5, consists of one or more intermeshing toothed wheels and a ratchet mounted in a suitable casing. The usual and well-known arrangement of registering dial-wheels is shown and consists of the toothed wheel W, having fixed upon one of its flat sides the smaller one-toothed wheel $w'$. A toothed wheel W' overlaps the wheel W and intermeshes with the tooth on the one-toothed wheel $w'$. The ratchet $w$ successively engages the teeth of the wheel W, turning it in the direction of the arrow, Fig. 5. One revolution of the wheel W and the one-toothed wheel $w'$ will turn the wheel W' the distance of one of its teeth in the direction shown by the arrow, Fig. 1. Openings $o$ $o'$ are cut in the front of the register-casing, through which the numbers on the dial-wheels W and W' are read. The ratchet has a depending weight $w^2$, which moves in the guideway formed on the inner wall of the casing by the side of the casing and the partition $w^3$. The ratchet is pivoted in bearings on top of this weight, and one arm projects from the side of the casing in the path of the rocker-arm, which is keyed on the end of a shaft P and at right angles thereto. The other end of the ratchet stands out toward, but not in the path of, the toothed register-wheel. When the rocker-arm $p$ is moved up, as presently explained, it engages the projecting end of the ratchet and turns it on its pivot, so as to place its other end nearer the toothed wheel. The top of the weight forms a stop for such turning, and the continued upward movement of the rocker-arm lifts the weight and the ratchet $w$ against the tooth of the wheel and turns the wheel the width of one tooth. The rocker-arm $p$ then falls back to its normal position carrying with it by means of the fork $p^3$ the ratchet and weight, thus resetting the ratchet mechanism. The weight on the ratchet would be sufficient; but the fork insures that the ratchet will go back to its normal position. The rocker-arm shaft P passes through a bore in the face-plate and back alongside the frame, and by a right-angle bend $p'$ projects through a slot in the side plate into the ball-raceway into the path of the passing ball. A spring $p^2$ on the shaft P tends to turn the shaft P, so as to hold the bent arm $p'$ down on top of the top ball in the incline $b^2$. Suitable hangers $p^4$ support the shaft P and form bearings in which it turns. When the plug is inserted, it pushes the balls in the incline $b^3$ up, and the top ball in being pushed up will pass and lift the arm $p'$ and turn the shaft P and the rocker-arm $p$. The rocker-arm $p$ actuates the registering mechanism, as before explained.

Customarily only calling subscribers are charged; but, as before explained, the registering mechanism is actuated upon every insertion of the plug, and hence the registers of both the calling and the called subscriber would be actuated. To obviate this, I provide for automatically disengaging the register of the called subscriber. The casing of the register is pivoted at its upper left-hand corner to the face-plate C and is free to swing to the right. An arm $r$ extends from its lower right-hand corner down to a point near the plug-orifice $c^2$, where it is bent in the form of a cam $r'$. Suitable stops $r^2$ $r^3$ limit the movement of the casing, and a spring $r^4$ presses the arm against the stop $r^2$, which is its normal position. When in this position, the diameter of the flange or collar $x$ on the plug used for the calling subscriber (answering-plug, Fig. 8) is not sufficient to reach the cam $r'$ on the arm $r$, and hence will not move the register-casing. The flange or collar $y$ on the plug used for the called subscriber (calling-plug, Fig. 9) is of greater diameter, and when the plug is inserted the collar will ride down on the bevel or cam $r'$ and push it away from the plug-orifice $c^2$, and thereby cause the register-casing to swing to the right on its pivot and take its projecting ratchet out of reach of the upward turn of the rocker-arm $p$. The flange $y$ on the plug used for the called subscriber is at such distance from the inner end of the plug that the register will be disengaged just before the balls in the incline are pushed up. The stop $r^2$ may be in the form of an eccentric button, so that when turned with its least projection toward the arm $r$ the cam $r'$ will be in reach of the flange $y$ of the plug used for the called subscriber. When turned with its greatest projection toward the arm $r$, it will hold said arm out of reach of the plug-flange. This is desirable under some circumstances. The handles $w^4$ and $w^5$ are fastened to the dial-wheels and project from the casing for resetting the register. The springs $x'$ $y'$ on the plugs will supplement the action of the operators' spring-arms to retract the plugs after the pressure on them is released; but obviously they may be dispensed with.

Another feature of my invention is the provision of the operator's night-bell or auxiliary signal. At the front of the vertical arm $b^4$, Fig. 2, of the raceway I fasten a delicate spring-plate N, which normally hangs out in the path of the falling ball, and under the hanging end of this spring-plate is fastened a similar contact-plate N'. From the upper end of the spring-plate N and from the contact-plate N' wires $n$ $n'$ lead to the operator's night-bell or other auxiliary signal, such as a monitor lamp. Now when the magnet is energized and a ball is tripped the ball drops down and presses the spring-plate N into contact with the contact-plate N' and rings the night-bell. This spring-plate N hangs down just far enough to be pressed against the contact-plate N' so long as the ball just dropped rests upon the ball normally held at the bottom of the passage; but when the plug pushes said ball out of the way the ball just dropped will be let down and allow the spring-plate N to break its contact with the plate N', and thus stop the ringing of the night-bell.

It is obvious that in a grounded circuit one of the generators and one of the line-wires can be dispensed with in my combined annunciator and spring-jack and make the balls of conducting material, so that when the ball is held between the line-spring and generator-spring the circuit will be from the telephone through line-spring, across ball to generator-spring, and along connecting-wire to generator and to earth and through earth back to telephone, so that so long as the ball is held in that position that generator will ring connecting-telephone, but will not ring back through cord by reason of the diameter of the ball being greater than the plug, so that the line-contact is not made with the plug until the ball has passed beyond the generator-strip. In night-bell or auxiliary signal circuit the balls would act as connection between two poles of springs leading to bell and battery.

In reconstructing or remodeling a switchboard which is supplied with night-bell listening-contacts and registering mechanism my combined spring-jack and annunciator would obviously be constructed a little differently than as shown in the drawings. The rear inclined arm of the raceway would be omitted and make the lower arm incline to the upper arm. Only one ball would be used in such case.

I claim—

1. In a switchboard, a combined spring-jack and annunciator, a casing therefor, a ball-raceway a portion of which forms a plug-socket, a ball movable therein, a plug for said socket, electrical contacts located within said socket for engagement by said plug and said ball, of operators' contacts adjacent and normally disconnected from the line, of means for contacting the operators' contacts with the line consisting of a spreader having a stem, spring-projected into the socket in the path of the plug, and adapted to be compressed thereby to bridge the line.

2. In a telephone-switchboard, a spring-jack socket forming a ball-raceway, a ball movable therein, a plug for said jack-socket, a register device, means for operating said register device including a rocker-arm projecting at one end into said jack-socket and adapted to be operated upon the insertion of the plug.

3. In a telephone-switchboard, a jack-socket forming a ball-raceway, a ball movable therein, a plug for said jack-socket, a register device, means for operating said register device including a rocker-arm projecting at one end into said jack-socket and adapted to be operated upon the insertion of the plug, of means carried by the plug adapted to disconnect said register device and its operative means.

4. In a telephone-switchboard, a combined spring-jack and annunciator, a casing therefor, having an endless ball-raceway, and a multiple of plug-driven balls movable in column therein, in combination with a register device fixed to said casing, means for operating said register by said plug-driven balls, and means carried by said plug for disengaging said register device.

5. In a telephone-switchboard, a combined spring-jack and annunciator, a casing therefor, a ball-raceway therein and plug-socket, a plug and a plug-driven ball movable in said raceway and forming a visual signal therein in combination with a register device, adapted to be operated on the insertion of said plug, of means operated by said plug for disconnecting said register.

6. In a telephone-switchboard, a combined spring-jack and annunciator, a casing therefor having an endless ball-raceway confining and guiding in column a multiple of balls, a register device pivoted to said casing, and means actuated by said balls to operate said register.

7. In a telephone-switchboard a combined spring-jack and annunciator, a casing therefor having an endless ball-raceway confining and guiding in column a multiple of plug-driven balls, in combination with a register device pivoted to the face of said casing, and means for operating said register device consisting of a shaft having an arm projecting into said raceway in the path of the plug-driven balls and adapted to be successively rocked thereby, said rocker-shaft being normally connected to the register device, and means for disconnecting said shaft and register.

8. In a combined spring-jack and annunciator for telephone and like switchboards, a raceway forming a jack-socket a plug therefor a plug-driven ball movable therein, in combination with a register device and means operative by said plug for operating said register device.

In testimony whereof I affix my signature in presence of two witnesses.

HOWARD FEILD JONES.

Witnesses:
A. E. H. JOHNSON,
A. ROLAND JOHNSON.